United States Patent [19]
Hosaka

[11] 3,898,615
[45] Aug. 5, 1975

[54] TIRE CONDITION MONITORING SYSTEM

[75] Inventor: Akio Hosaka, Yokohama, Japan

[73] Assignee: Nissan Motor Company Limited, Yokohama, Japan

[22] Filed: Mar. 18, 1974

[21] Appl. No.: 452,470

[30] Foreign Application Priority Data
Mar. 19, 1973 Japan.............................. 48-32567

[52] U.S. Cl................................ 340/58; 200/61.22
[51] Int. Cl.²......................................... B60C 23/00
[58] Field of Search ......... 340/58; 200/61.22, 61.25

[56] References Cited
UNITED STATES PATENTS

| | | | |
|---|---|---|---|
| 3,374,460 | 3/1968 | Massoubre............................ | 340/58 |
| 3,614,732 | 10/1971 | Lejeune................................ | 340/58 |
| 3,831,161 | 8/1974 | Enabnit............................ | 340/58 X |

*Primary Examiner*—Alvin H. Waring

[57] ABSTRACT

A tire mounted sensor and rotatable coil are connected in series and a switch in the sensor closes when the tire pressure is low or the temperature is excessive.

A feedback coil of an oscillator is mounted on the vehicle structure in such a manner as to be adjacent to the rotatable coil, and inductive coupling between the coils produces oscillation in the oscillator when alarm light or buzzer is energized in response to oscillation in the oscillator.

1 Claim, 3 Drawing Figures

PATENTED AUG 5 1975　　　3,898,615

TIRE CONDITION MONITORING SYSTEM

This invention relates to an improved tire condition monitoring system that permits automatic detection of certain abnormal conditions of vehicle tires, such as low air pressure and excessive tire temperature, to give a warning to the driver.

In order that the vehicle tires perform their essential functions, it is important to maintain proper air pressure in the tires. An underinflated pneumatic tire, as is well known, tends to generate excessive heat because of inordinate flexing of the sidewalls as the tire rotates, and because of increased frictional resistance due to the larger area of the tire which is in contact with the road. Furthermore, a tire with insufficient pressure tends to generate "standing waves" during high speed driving, as a result of which the tire is deformed polygonally, and also causes a "hydroplanning" phenomenon during driving in rainy weather. These phenomena often cause accidents. To detect the abovementioned unwanted tire conditions, it was a usual practice for the driver to empirically judge whether the tires were underinflated by the "feeling" of the steering. However, this judgment was inevitably inaccurate. Further, it is impossible to sense the tire temperature except by touching the tires after the vehicle comes to a complete stop.

Therefore, there have been proposed and developed various methods of detecting abnormal conditions of vehicle tires. An aspect of one conventional system is that a suitable physical connection is provided between the portion of the system mounted on the rotating wheel and the remainder of the system. The physical connection, such as a slip ring or a brush, is employed to transmit information representing the tire condition from a sensor mounted on the rotating tire to the portion of the system mounted on the body. In the abovementioned prior art, however, some defects are pointed out in that severe environmental conditions such as inclement weather and bad roads may tend in time to cause the physical connection to become unreliable. Therefore, to avoid unwanted matters inherent in a system using a physical connection, another tire monitoring system has been proposed in which the information from the sensor is sent by a transmitter unit in the wheel to a receiver attached to the vehicle body. However, in spite of the advantages of the latter prior art over the former, several shortcomings also are encountered as described below. Firstly the received electrical signal is so weak that the system requires an amplifier to amplify it sufficiently to actuate a warning device. Secondly, the system requires batteries or some other power source mounted on the wheel for supplying power to the transmitter. This requirement creates a new problem in assuring a reliable power supply for the transmitter unit. Thirdly, the receiver cannot discreminate whether a signal applied thereto is a unwanted external one or not, so that the system needs filtering means for eliminating noise in the receiver. The system is thus complicated in circuit arrangement and expensive in manufacturing.

In the present invention, sensor means are mounted on the tire assembly to sense abnormal conditions thereof, such as low air pressure and excessive tire temperature. A rotatable coil is mounted coaxially on the tire assembly and electrically connected to the sensor to form a series circuit therewith. The sensor reduces the impedance value of the series circuit below a predetermined value upon sensing of an abnormal condition. A fixed coil is mounted rigidly on the frame of the vehicle for inductive coupling with the rotatable coil and serves as a feedback coil for a vehicle frame mounted oscillator. The series circuit mounted on the tire assembly controls the degree of flux transfer between the coils, and thereby the degree of positive feedback to the oscillator. The oscillator starts to oscillate when the impedance drops below the predetermined value, or upon the occurrence of an abnormal condition of the tire. A detector is connected to the oscillator for sensing the output energy thereof, which in turn feeds its output energy to a warning device, which responds by giving a warning to the driver. As seen from the above description, the inductive coupling between the coils is not affected by revolution of the tire, so that sensing of the tire conditions can be attained even while the vehicle is stopped or is moving slowly. Furthermore, since the warning device receives directly electrical energy from the oscillator, a system of the present invention does not require an amplifier to actuate the warning device. Still further, the present system does not employ a transmitter and receiver, so that it is not adversely affected by external noise.

Therefore, the primary object of the present invention is to provide an improved system for detecting certain abnormal conditions of vehicle tires, which overcomes the above-mentioned shortcomings inherent in the piror art.

It is another object of the present invention is to provide an improved system capable of a detecting certain abnormal conditions of tires even while the vehicle is at rest.

These and other objects, features and many attendant advantages of this invention will be appreciated more readily as the same becomes better understood by reference to the following detailed description, when considered in connection with the accompanying drawings, wherein like parts in each of the several figures are identified by the same reference characters, and wherein.

Figure 1:
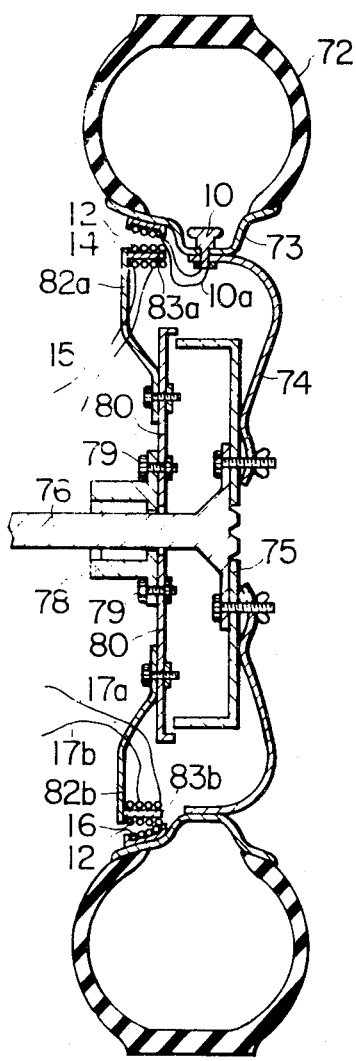
FIG. 1 shows the arrangement of a tire condition monitoring system in accordance with the present invention in relation to a wheel and adjacent parts of a vehicle.
Figure 2:
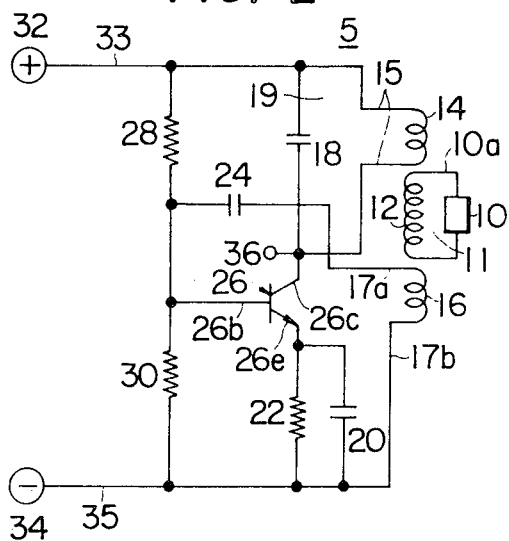
FIG. 2 is a partial circuit diagram of a tire condition monitoring system in accordance with the present invention.

Reference is now made to FIGS. 1 and 2. In FIG. 1 there is depicted an arrangement of a tire condition monitoring system in accordance with the present invention in relation to a wheel and adjacent parts of a vehicle, and in FIG. 2 there is shown a partial circuit diagram of the present invention. A pneumatic tire 72 is mounted on a rim 73 of a wheel 74 which is bolted to a hub 75 rotating with an axle 76. A journal member 78 is secured to a frame 80 by means of bolt-nut assemblies 79 in such a way as to permit the axle 76 to rotate about its longitudinal axis. As seen from the drawing, to the frame 80 are also secured support members 82a and 82b, which in turn carry first and second fixed or stationary coils 14 and 16 wound on projections 83a and 83b protruding therefrom, respectively. The purpose of the supporting members 82a and 82b and the projections 83a and 83b is situate the stationary coils 14 and 16 adjacent to a rotatable coil 12 for securing sufficient inductive coupling therebetween. The rotatable coil 12 is mounted coaxially on the tire assembly (in the drawing, on the rim 73) by means of a suitable reel (no numeral) made of, for instance, resin. As mentioned above, the stationary coils 14 and 16 are arranged to inductively couple with the rotatable coil 12. However, they are separated inductively from each other. This means that inductive coupling between the stationary coils 14 and 16 is only attained by way of the rotatable coil 12. If desired, the coils 14 and 16 may be sections of a single coil, but inductively separated from each other. The above-mentioned relationship will be most understood by reference to FIG. 2. Since the rotatable coil 12 is coaxially mounted on the tire assembly, the inductive coupling between the rotatable coil 12 and each of the stationary coils 14 and 16 is maintained irrespective as to whether the vehicle is moving or not. A sensor 10 is mounted on the tire assembly (no numeral) as illustrated in the drawing for sensing an abnormal condition of the tire 22, such as low air pressure and/or excessive temperature, and is electrically connected to the rotatable coil 12 through lead 10a to form a series circuit 11 therewith. The series circuit 11 controls the degree of inductive coupling between the stationary coils 14 and 16, which form part of the circuit illustrated in FIG. 2. In FIG. 2, there is shown a tuned-collector oscillator denoted by a numeral 5, wherein the first and second stationary coils 14 and 16 are provided as positive feedback coils. The first stationary coil 14 and a capacitor 18 are connected in parallel through leads 15 and form a resonant circuit 19. On terminal of the resonant circuit 19 is connected to a collector electrode 26c of a transistor 26 through a lead 17a, the other terminal thereof being connected to a positive terminal 32 of a vehicle battery (not shown) through a lead 17b. A voltage divider, which consists of resistors 28 and 30, is interposed between bus lines 33 and 35 leading from the battery, and applies a suitable bias potential to a base electrode 26b of the transistor 26. The bus line 35 leads from a negative battery terminal 34. The second stationary coil 16 is connected between the base electrode 26b through a coupling capacitor 24 for positive feedback to the oscillator 5, and the bus line 35 through leads 17. An emitter electrode 26e of the transistor 26 is connected to the bus line 35 through a resistor 22 and a capacitor 20 arranged in parallel. The oscillator 5 produces oscillation therein if the inductive coupling between the stationary coils 14 and 16 is sufficient. This is controlled by varying the impedance of the series circuit 11, which comprises the sensor 10 and the rotatable coil 12. When a switch (not shown) in the sensor 10 is open, induced current flowing through the coil 12 is negligibly small of zero, so that oscillation in the oscillator 5 will not occur due to poor inductive coupling between the stationary coils 14 and 16. This is due to insufficient positive feedback. On the contrary, the sensor 10 reduces the impedance of the series circuit 11 below a predetermined value by changing the switch, so that the oscillator 5 produces oscillation therein since positive feedback is satisfactorily achieved due to sufficient inductive coupling between the stationary coils 14 and 16. Consequently, if the sensor 10 senses an abnormal condition in the tire to reduce the resistance of the series circuit 11 below the predetermined value, the oscillator 5 oscillates. Thus, by sensing the existence of oscillation in the system, the present system can detect an unsafe or abnormal condition of the tire. Output energy from the oscillator 5 is fed from a terminal 36 to a detector and alarm device, which will be described in detail later. The sensor 10, in practice, comprises pressure and temperature sensitive elements arranged in parallel or series. As the pressure sensitive element, a pressure sensitive switch or device varying its resistance according to tire air pressure may be employed. The temperature sensitive element may be bimetal element or an NTC (Negative Temperature Coefficient) thermister. As seen from the drawing, the present system is applied to a tubeless tire, wherein the sensor 10 is secured in the manner illustrated to the wheel rim 73 so that it does not impede mounting or demounting of the tire 72. To permit testing of the sensor 10 during routine maintenance of the warning system, the sensor 10 is preferably threaded to permit it to be detached from the wheel 74. However, in a case where a tire having an inner tube is employed, the sensor 10 can be mounted on the valve stem or in any other location where it can sense the inner tube condition.

Figure 3:
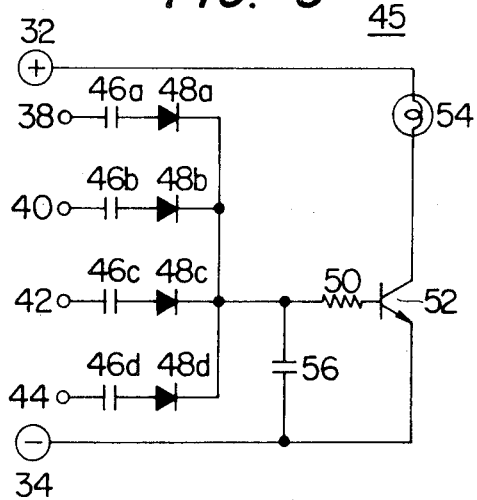
FIG. 3 is another partial circuit diagram of a tire condition monitoring system in accordance with the present invention.

Referring to FIG. 3, there is shown a detector and alarm device 45 connected to the FIG. 2 circuit for detecting oscillation in the oscillator 5 and giving a warning to the driver. The circuit arrangement illustrated in FIG. 3 is a conventional OR gate connected to an alarm lamp 54. Output energy from the terminal 36 of the FIG. 2 circuit is fed to a terminal 38. The a.c. component passes through a capacitor 46a and is rectified by a diode 48a. This energy begins to charge a capacitor 56 and elevate the base potential of a transistor 52 through a resistor 50 with the result that the transistor 52 is rendered conductive and the alarm lamp 54 is lighted up to give a warning to the driver. It is readily understood that other suitable alarm means such as a buzzer can be substituted for the lamp 54. If the present system is applied to a four wheeled vehicle, terminals 38, 40, 42 and 44 would be connected, for example, to four oscillators provided for right front, right rear, left front and left rear, tires (not shown), respectively, in which case capacitors 46b, 46c and 46d and diodes 48b, 48c and 48d would be provided. It is understood that a terminal for a spare tire could also be added to the FIG. 3 circuit, if desired. In the present circuit arrangement, since the warning lamp 54 is used in common, it is unable to discriminate which tire has an abnormal condition. However, circuit modification for detecting an abnormal condition in an individual tire can be readily achieved if desired. In the above description, the abnormal condition is made known to the driver when the sensor 10 reduce the impedance of the series circuit 11 below the predetermined value, so that the oscillator 5 is energized. However, it is clearly understood that the present system can be modified such that interruption of oscillation corresponds to an abnormal condition of a tire.

Because the monitoring system here disclosed can be embodied in various physical forms, it is not intended that the invention be limited to the precise arrangement here utilized or described. Rather, it is intended that the invention be limited only by the appended claims and include those modified arrangements that do not fairly depart from the essence of the invention.

What is claimed is:

1. A system for automatically detecting an abnormal condition of a vehicle tire, comprising:
   a sensor rotatable with the tire for detecting the abnormal condition;
   a rotatable coil concentrically mounted on a framework of a wheel on which the tire is fitted and connected in a series circuit arrangement with said sensor so that the impedance of the series circuit is reduced below a predetermined value by said sensor in response to the detected abnormal condition;
   an oscillator mounted on the vehicle structure including a pair of separate coils mounted adjacent to and on the inner side of said rotatable coil for inductive coupling therewith through said rotatable coil when the impedance of the series circuit is below said predetermined value; said pair of coils being spaced apart to face separate peripheral areas of said rotatable coils; and
   an alarm device connected to said oscillator to produce a warning signal in response to oscillation therein;
   whereby when the impedance of the series circuit is below said predetermined value, inductive coupling between said fixed and rotatable coils allows sufficient feedback for said oscillator to produce oscillation therein.

* * * * *